United States Patent
Soliman et al.

(10) Patent No.: US 8,126,689 B2
(45) Date of Patent: *Feb. 28, 2012

(54) METHODS FOR GEOMECHANICAL FRACTURE MODELING

(75) Inventors: Mohamed Y. Soliman, Plano, TX (US); Loyd E. East, Jr., Frisco, TX (US); David Adams, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/728,295

(22) Filed: Dec. 4, 2003

(65) Prior Publication Data

US 2005/0125209 A1 Jun. 9, 2005

(51) Int. Cl.
*G06G 7/48* (2006.01)

(52) U.S. Cl. .................................. 703/10; 703/2; 703/6

(58) Field of Classification Search ................ 703/7, 10, 703/2, 6; 405/129.35, 129.5, 178
See application file for complete search history.

(56) References Cited

U.S. PATENT DOCUMENTS 4,712,182 A * 12/1987 Wakamori et al. .............. 702/36

(Continued)

FOREIGN PATENT DOCUMENTS

WO WO 01/81724 * 11/2001

(Continued)

OTHER PUBLICATIONS

M.Y. Sollman, J. L. Hunt, and A. M. Elrabaa, "Fracturing Aspects of Horizontal wells", 1990 Society of Petroleum Engineers, pp. 966-973.*

(Continued)

*Primary Examiner* — Kamini S Shah
*Assistant Examiner* — Kibrom Gebresilassie
(74) *Attorney, Agent, or Firm* — Robert A. Kent; McDermott Will & Emery LLP

(57) ABSTRACT

The present invention relates generally to methods for designing and optimizing the number, placement, and size of fractures in a subterranean formation and more particularly to methods that account for stress interference from other fractures when designing and optimizing the number, placement, and size of fractures in the subterranean formation. The present invention optimizes the number, placement and size of fractures in a subterranean formation. The present invention determines one or more geomechanical stresses induced by each fracture based on the dimensions and location of each fracture. The present invention determines a maximum number of fractures and a predicted stress field based on the geomechanical stresses induced by each of the fractures

31 Claims, 14 Drawing Sheets

U.S. PATENT DOCUMENTS

| | | | | |
|---|---|---|---|---|
| 4,828,028 | A | * | 5/1989 | Soliman .................. 166/250.1 |
| 5,025,859 | A | * | 6/1991 | Hanson et al. ............ 166/252.1 |
| 5,031,163 | A | * | 7/1991 | Holzhausen et al. .......... 367/35 |
| 5,074,359 | A | * | 12/1991 | Schmidt .................. 166/280.1 |
| 5,085,276 | A | * | 2/1992 | Rivas et al. .................. 166/303 |
| 5,183,109 | A | * | 2/1993 | Poulsen .................. 166/250.1 |
| 5,206,836 | A | * | 4/1993 | Holzhausen et al. .......... 367/35 |
| 5,277,062 | A | * | 1/1994 | Blauch et al. ............. 73/152.11 |
| 5,318,123 | A | * | 6/1994 | Venditto et al. ............ 166/250.1 |
| 5,463,164 | A | * | 10/1995 | Perkins .................. 588/250 |
| 5,482,116 | A | * | 1/1996 | El-Rabaa et al. .......... 166/250.1 |
| 5,499,678 | A | * | 3/1996 | Surjaatmadja et al. ....... 166/298 |
| 5,765,642 | A | * | 6/1998 | Surjaatmadja .............. 166/297 |
| 5,894,888 | A | * | 4/1999 | Wiemers et al. ........... 166/250.1 |
| 5,934,373 | A | * | 8/1999 | Warpinski et al. .......... 166/250.1 |
| 5,960,369 | A | * | 9/1999 | Samaroo .......................... 702/6 |
| 6,425,448 | B1 | * | 7/2002 | Zupanick et al. ................. 175/61 |
| 6,439,310 | B1 | * | 8/2002 | Scott et al. .................. 166/308.1 |
| 6,598,481 | B1 | | 7/2003 | Schultz ........................... 73/702 |
| 6,604,580 | B2 | * | 8/2003 | Zupanick et al. ............. 166/245 |
| 6,724,687 | B1 | * | 4/2004 | Stephenson et al. ............ 367/32 |
| 6,785,641 | B1 | * | 8/2004 | Huang ............................. 703/7 |
| 6,795,773 | B2 | * | 9/2004 | Soliman et al. .................. 702/6 |
| 6,876,959 | B1 | * | 4/2005 | Peirce et al. ..................... 703/10 |
| 6,935,424 | B2 | * | 8/2005 | Lehman et al. ............ 166/250.1 |
| 7,043,410 | B2 | * | 5/2006 | Malthe-Sorenssen et al. ... 703/2 |
| 7,062,420 | B2 | * | 6/2006 | Poe, Jr. ............................ 703/10 |
| 7,089,166 | B2 | * | 8/2006 | Malthe-Sorenssen et al. . 703/10 |
| 7,104,320 | B2 | * | 9/2006 | Buchanan et al. ............ 166/245 |
| 7,111,681 | B2 | * | 9/2006 | Detournay et al. ........ 166/250.1 |
| 7,451,812 | B2 | * | 11/2008 | Cooper et al. ............. 166/250.1 |
| 7,565,278 | B2 | * | 7/2009 | Li et al. .......................... 703/10 |
| 7,598,898 | B1 | * | 10/2009 | Funk et al. ...................... 342/22 |
| 7,677,306 | B2 | * | 3/2010 | Lecampion et al. ....... 166/250.1 |
| 7,925,482 | B2 | * | 4/2011 | Kennon et al. .................. 703/10 |
| 7,946,340 | B2 | * | 5/2011 | Surjaatmadja et al. .... 166/250.1 |
| 7,950,457 | B2 | * | 5/2011 | Seekford ...................... 166/298 |
| 8,025,101 | B2 | * | 9/2011 | Hansen et al. ............. 166/272.2 |
| 2002/0029137 | A1 | * | 3/2002 | Malthe-Sorenssen et al. . 703/10 |
| 2002/0043370 | A1 | * | 4/2002 | Poe ........................... 166/250.07 |
| 2003/0050758 | A1 | * | 3/2003 | Soliman et al. ................... 702/6 |
| 2003/0150263 | A1 | * | 8/2003 | Economides et al. ..... 73/152.48 |
| 2004/0016541 | A1 | * | 1/2004 | Detournay et al. ........ 166/250.1 |
| 2004/0122640 | A1 | * | 6/2004 | Dusterhoft ...................... 703/10 |
| 2004/0176911 | A1 | * | 9/2004 | Bratton et al. .................... 702/6 |
| 2004/0206495 | A1 | * | 10/2004 | Lehman et al. ............ 166/250.1 |
| 2005/0121193 | A1 | * | 6/2005 | Buchanan et al. ............ 166/281 |
| 2005/0121196 | A1 | * | 6/2005 | East et al. .................. 166/308.1 |
| 2005/0149307 | A1 | * | 7/2005 | Gurpinar et al. ................ 703/10 |
| 2005/0203723 | A1 | * | 9/2005 | Geehan et al. .................... 703/6 |
| 2005/0274510 | A1 | * | 12/2005 | Nguyen et al. ........... 166/250.12 |
| 2006/0015310 | A1 | * | 1/2006 | Husen et al. .................... 703/10 |
| 2006/0102342 | A1 | * | 5/2006 | East et al. .................. 166/250.1 |
| 2007/0235181 | A1 | * | 10/2007 | Lecampion et al. ........ 166/177.5 |
| 2009/0125280 | A1 | * | 5/2009 | Soliman et al. .................. 703/1 |
| 2009/0194273 | A1 | * | 8/2009 | Surjaatmadja et al. .... 166/250.1 |
| 2011/0029293 | A1 | * | 2/2011 | Petty et al. ....................... 703/2 |
| 2011/0247824 | A1 | * | 10/2011 | Gu ............................. 166/308.1 |

FOREIGN PATENT DOCUMENTS

WO      WO 01/81724 A1      11/2001

OTHER PUBLICATIONS

M.Y. Soliman, J. L. Hunt, and A. M. Elrabaa, "Fracturing Aspects of Horizontal wells", herein referred as Soliman, 1990 Society of Petroleum Engineers, pp. 966-973.*

M.Y. Soliman, J. L. Hunt, and A. M. Elrabaa, "Fracturing Aspects of Horizontal wells", 1990 Society of Petroleum Engineers, pp. 966-973.*

M.Y. Soliman, J. L. Hunt, and A. M. El Rabaa, "Fracturing Aspects of Horizontal wells", (herein referred as Soliman), 1990 Society of Petroleum Engineers, pp. 966-973.*

D.W. Sobernheim, A.M. Aly, S.A. Denoo, W.S. Rowe, S.D. Sturm, D.J. White, "An Integrated Technique to Optimize the Completions in Low Permeability Gas Reservoirs While Improving Efficiency and Productivity", SPE 84171, 2003.*

M.Y. Soliman, J. L. Hunt, and M. Azari, "Fracturing Horizontal Wells in Gas Reservoirs", SPE 1999.*

Soliman, et al.: "Fracturing Horizontal Wells in Gas Reservoirs," SPE Prod. & Facilities 14(4), (XP-002318610), pp. 277-283, 1999.

Mukherjee, et al.: "A Parametric Comparison of Horizontal and Vertical Well Performance," Society of Petroleum Engineers, SPE 18303, 1991.

Sobernheim, et al.: "An Integrated Technique to Optimize the Completions in Low Permeability Gas Reservoirs While Improving Efficiency and Productivity," Society of Petroleum Engineers, SPE 84171, 2003.

Zerzar, et al.: "Interpretation of Multiple Hydraulically Fractured Horizontal Wells in Closed Systems," Society of Petroleum Engineers, SPE 84888, 2003.

Soliman, M. Y.: "Interpretation of Pressure Behavior of Fractured, Deviated, and Horizontal Wells," SPE 21062, SPE Latin American Petroleum Engineering Conference, Rio de Janeiro, Oct. 14-19, 1990, pp. 1-9, 1990.

Hubert, M. K., and Willis, D. G.: "Mechanics of Hydraulic Fracturing," Trans. AIME, 1957, vol. 210, pp. 153-168, 1957.

El Rabaa, W.: "Experimental Study of Hydraulic Fracture Geometry Initiated from Horizontal Wells," SPE 19720, SPE Annual Technical Conference and Exhibition, San Antonio, TX, Oct. 8-11, 1989, pp. 1-16, 1989.

Hoek, E., and Brown, E. T.: "Empirical Strength Criterion for Rock Masses," J. Geotech Eng. Div., ASCE, vol. 106, GT9, pp. 1013-1035, 1980.

Lyunggren, C., Amadei, B., and Stephansson, O.: "Use of Hoek and Brown Failure Criterion to Determine In-Situ Stresses From Hydraulic Fracturing Measurements," In Proc. Care 88, Newcastle Upon Tims, Jan. 1988, London, pp. 133-142, 1988.

Soliman, and Boonen, P., Rock Mechanics and Stimulation Aspects of Horizontal Wells. Journal of Petroleum Science and Engineering, 25(2000), pp. 187-204, 2000.

Owens, K. A., Anderson, S. A., and Economides, M. J.: "Fracturing Pressures for Horizontal Wells," presented at SPE Annual Technical Conference and Exhibition, Washington D. C., Oct. 4-7, 1992, SPE 24822, pp. 1-8, 1992.

Daneshy, A. A.: "A Study of Inclined Hydraulic Fractures," SPE 04062, SPEJ, Apr. 1973, pp. 61-68, 1973.

Economides, M. J., McLennan, J. D., Brown, E., and Roegiers, J. C.: "Performance and Stimulation of Horizontal Wells," World Oil, Jun. 1989, pp. 41-45, Jul. 1989, pp. 69-76, 1989.

Abass, H, H., Hedayati, Saeed, and Meadows, D. L. L.: "Non-Planar Fracture propagation From a Horizontal Wellbore: Experimental Study," SPE 24823, presented the Annual Technical Meeting of SPE held in Washington DC. Oct. 4-7, 1992, pp. 1-5, 1992.

Veeken, C. A. M., Davies, D. R., and Walters, J. V.: "Limited Communication between Hydraulic Fracture and (Deviated) Wellbore," SPE 18982, presented at the 1989 SPE Low Permeability Reservoir Symposium, Denver CO, Mar. 6-8, 1989, pp. 1-12, 1989.

Yew, C. H. and Li, Y.: "Fracturing of a Deviated Well," SPE 16930, SPE Production Engineering, Nov. 1988, pp. 509-518, 1988.

Baumgartner, J., Carvalho, J., and McLennan, J.: "Fracturing Deviated Boreholes: An Experimental Laboratory Approach," Rock at Great Depth. Maury & Fourmaintraux (eds). vol. 2, 1989 Balkema, Rotterdam, pp. 929-937, 1989.

Hallam, S. D., and Last, N. C.: "Geometry of Hydraulic Fractures from Modestly Deviated Wellbores," SPE 20656 presented at the 1990 Annual Technical Meeting, held in New Orleans, LA, Sep. 23-25, pp. 1-10, 1990.

Kim, C. M., and Abass, H. H.: "Hydraulic Fracture Initiation from Horizontal Wellbores: Laboratory Experiments," 32nd US Symposium on Rock Mechanics, Jul. 10-12, 1991, University of Oklahoma, Norman, OK, pp. 231-240, 1991.

Abou Sayed, I. S., Schueler, S., Ehrl, E,, and Hendricks, W.: "Multiple Hydraulic Fracture Stimulation in a Deep Horizontal Tight Gas Well," SPE 30532, presented at the 1995 Annual Technical Meeting, held in Dallas, TX, Oct. 22-25, 1995, pp. 1-6, 1995.

Viola, E., and Piva, A.: "Crack Path in Sheets of Brittle Material," Engineering Fracture Mechanics, vol. 19, No. 6, 1984, pp. 1069-1084, 1984.

Deimbacher, F. X., and Economides, M. J., and Jensen, O. K.: "Generalized Performance of Hydraulic Fractures With Complex Geometry Intersecting Horizontal Wells," SPE 25505, SPE, Richardson Texas, pp. 1-12, 1993.
Sneddon, I. N., and Elliott, H. A.: "The opening of a Griffith Crack under Internal Pressure," Quart. Appl. Math. (1946) IV, No. 3, pp. 262-267, 1946.
Sneddon, I. N.: "The Distribution of Stress in the Neighborhood of a Crack in an Elastic Solid," Proc., Royal society of London, Series A (1946) 187, pp. 229-260, 1946.
Wapinski, N. R., and Banagan, P. T.: "Altered-Stress Fracturing," SPE 17533, JPT, Sep. 1989, pp. 990-997, 1989.
Surjaatmadja, J. B., Grundmann, S.R., McDaniel, B., Deeg, W.F.J., Brumley, J.L., and Swor, L.C.: " Hydrajet Fracturing: An Effective Method for Placing Many Fractures in Openhole Horizontal Wells," SPE 48856, pp. 1-6, 1998.
Love T.G., McCarty, R.A., Surjaatmadja, J.B., Chambers, R.W. and Grundmann, S.R.: "Selectively Placing Many Fractures in Openhole Horizontal Wells Improves Production," SPE 50422, pp. 1-8, 1998.
Soliman, M.Y., Hunt, J.L., Azari, M.: "Fracturing Horizontal Wells in Gas Reservoirs," SPE 35260, pp. 103-110, 1996.
Soliman, M.Y., Hunt, J.L., El Rabaa, A.M.: "Fracturing Aspects of Horizontal Wells," SPE 35260, JPT, Aug. 1990, pp. 966-973, 1990.

* cited by examiner

METHODS FOR GEOMECHANICAL FRACTURE MODELING

BACKGROUND OF THE INVENTION

The present invention relates generally to methods for designing and optimizing the number, placement, and size of fractures in a subterranean formation and more particularly to methods that account for stress interference from other fractures when designing and optimizing the number, placement, and size of fractures in the subterranean formation.

One method typically used to increase the effective drainage area of well bores penetrating geologic formations is fracture stimulation. Fracture stimulation comprises the intentional fracturing of the subterranean formation by pumping a fracturing fluid into a well bore and against a selected surface of a subterranean formation intersected by the well bore. The fracturing fluid is pumped at a pressure sufficient that the earthen material in the subterranean formation breaks or separates to initiate a fracture in the formation.

Fracture stimulation can be used in both vertical and horizontal wells. Fracturing horizontal wells may be undertaken in several situations, including situations where the formation has:

1. restricted vertical flow caused by low vertical permeability or the presence of shale streaks;
2. low productivity due to low formation permeability;
3. natural fractures in a direction different from that of induced fractures, thus induced fractures have a high chance of intercepting the natural fractures; or
4. low stress contrast between the pay zone and the surrounding layers. In the fourth case, a large fracturing treatment of a vertical well would not be an acceptable option since the fracture would grow in height as well as length. Drilling a horizontal well and creating either several transverse or longitudinal fractures may allow rapid depletion of the reservoir through one or more fractures.

Shown in FIG. 1 is an example of a well bore, represented generally by the numeral 100, comprising a generally vertical portion 102 and two laterals 104 and 106. The generally vertical portion 102 is drilled in a generally vertical direction, and the laterals 104 and 106 are disposed at angles 108 and 110, respectively to the vertical portion 102. The well bore 100 is referred to as a horizontal well because it has one or more laterals (in the case of well 100, laterals 104 and 106). Typically, only the laterals 104 and 108 are open for production in a horizontal well. If the well 100 only had a generally vertical portion 102, it would be referred to as a vertical well. Typically, all production in a vertical well comes from the generally vertical portion 102.

Shown in FIG. 2 is a perspective view of the well bore 100 comprising lateral 104. The lateral 104 comprises three fractures 202, 204 and 206. Depending on the orientation of the lateral 204 to the direction of minimal stress, the fractures 202, 204 and 206 may be transverse or axial fractures. If the lateral 104 is drilled in direction of minimal stress, then the fractures 202, 204 and 206 are orientated perpendicular to the direction of minimal stress and are referred to as transverse fractures. If the lateral 104 is drilled perpendicular to the direction of minimal stress, then the fractures 202, 204 and 206 are orientated parallel to the direction of minimal stress and are referred to as axial fractures.

Each of the fractures 202, 204 and 206 typically has a narrow opening that extends laterally from the well bore. To prevent such opening from closing completely when the fracturing pressure is relieved, the fracturing fluid typically carries a granular or particulate material, referred to as "proppant," into the opening of the fracture and deep into the fracture. This material remains in each of the fractures 202, 204 and 206 after the fracturing process is finished. Ideally, the proppant in each of the fractures 202, 204 and 206 holds apart the separated earthen walls of the formation to keep the fracture open and to provide flow paths through which hydrocarbons from the formation can flow into the well bore at increased rates relative to the flow rates through the unfractured formation. Fracturing processes are intended to enhance hydrocarbon production from the fractured formation. In some circumstances, however, the fracturing process may terminate prematurely, for a variety of reasons. For example, the "pad" portion of the fracturing fluid, which is intended to advance ahead of the proppant as the fracture progresses, may undesirably completely "leak off" into the formation, which may cause the proppant to reach the fracture tip and create an undesirable "screenout" condition. Thus, properly predicting fracture behavior is a very important aspect of the fracturing process.

In the past, fracturing typically took place in well bores that were cased and perforated. The total number of fractures was a limited number per lateral in the case of fracturing horizontal wells and the fractures had sufficient space between each other such that stress interference between the fractures was minimal. With the advent of new fracturing technologies such as SURGIFRAC provided by Halliburton Energy Services, fractures may be placed in open hole well bores. Furthermore, it is now feasible and cost-effective to place many more fractures in a well bore. When many fractures are induced in a well bore, the geomechanical stress caused by fractures on each other can no longer be ignored. Current fracturing modeling methods, however, do not account for geomechanical stresses caused by one fracture on another.

SUMMARY OF THE INVENTION

The present invention relates generally to methods for designing and optimizing the number, placement, and size of fractures in a subterranean formation and more particularly to methods that account for stress interference from other fractures when designing and optimizing the number, placement, and size of fractures in the subterranean formation.

One embodiment of the present invention includes a method of optimizing a number, placement and size of fractures in a subterranean formation, including the steps of: determining one or more geomechanical stresses induced by each fracture based on the dimensions and location of each fracture; determining a geomechanical maximum number of fractures based on the geomechanical stresses induced by each of the fractures; and determining a predicted stress field based on the geomechanical stresses induced by each fracture.

Another embodiment of the present invention includes a computer implemented method for optimizing a number, placement and size of fractures in a subterranean formation, including the steps of: determining one or more geomechanical stresses induced by each fracture based on the dimensions and location of each fracture; determining a geomechanical maximum number of fractures based on the geomechanical stresses induced by each of the fractures; and determining a predicted stress field based on the geomechanical stresses induced by each fracture.

Another embodiment of the present invention includes a method of fracturing a subterranean formation, including the step of optimizing a number, placement and size of fractures in the subterranean formation, the step of optimizing including the steps of: determining one or more geomechanical stresses induced by each fracture based on the dimensions and location of each fracture; determining a geomechanical maximum number of fractures based on the geomechanical stresses induced by each of the fractures; determining a predicted stress field based on the geomechanical stresses induced by each fracture.

The features and advantage of the present invention will be readily apparent to those skilled in the art upon a reading of the description of the preferred embodiments which follows.

BRIEF DESCRIPTION OF THE DRAWINGS

The present invention is better understood by reading the following description of non-limitative embodiments with reference to the attached drawings wherein like parts of each of the several figures are identified by the same referenced characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

The present invention relates generally to methods for designing and optimizing the number, placement, and size of fractures in a subterranean formation and more particularly to methods that account for stress interference from other fractures when designing and optimizing the number, placement, and size of fractures in the subterranean formation. The present invention may be applied to vertical or horizontal wells. Furthermore, the present invention may be used on cased well bores or open holes.

Figure 3:
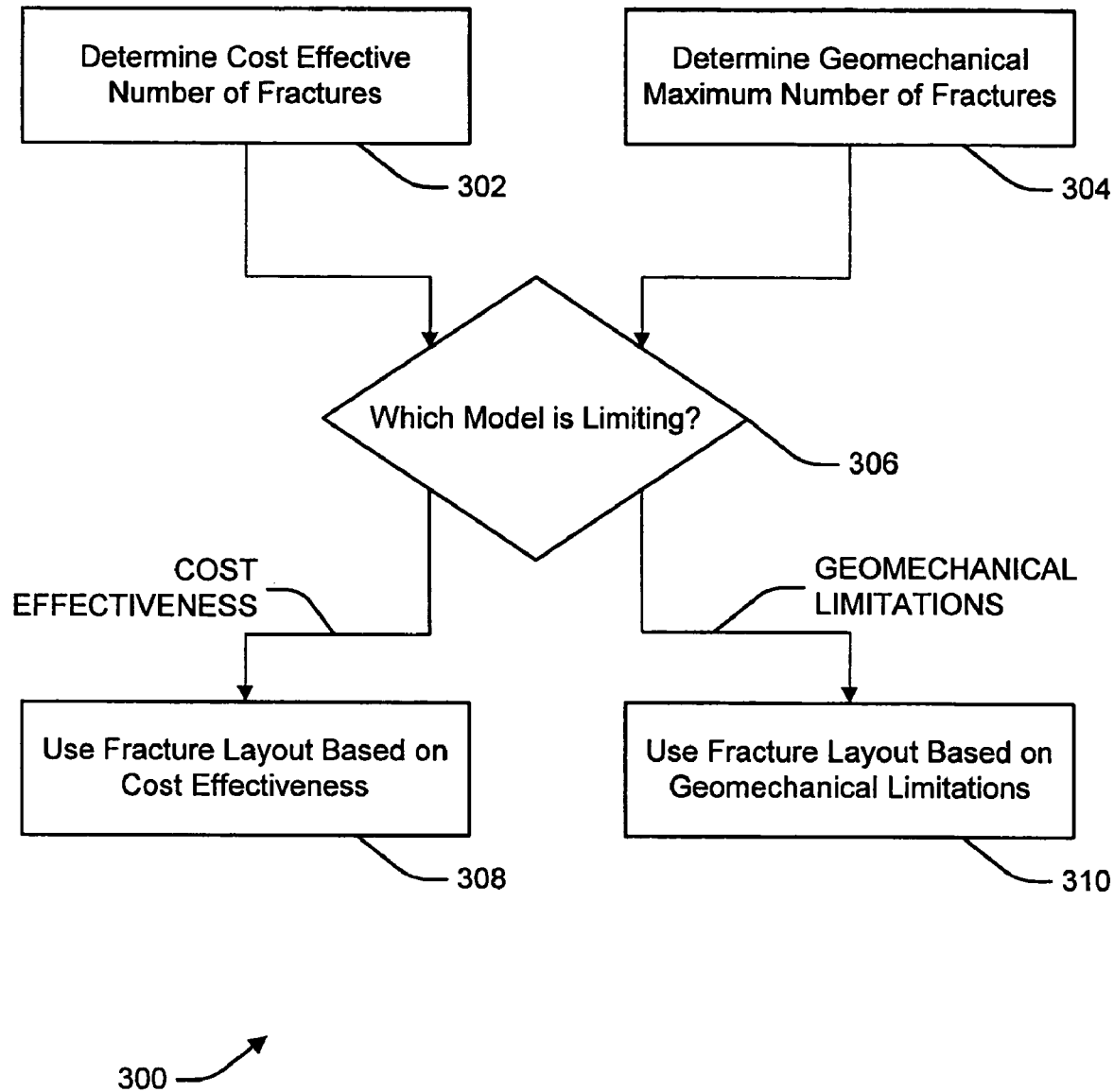
FIG. 3 illustrates a process flow diagram from an exemplary method of the present invention for creating a fracture layout.

FIG. 3 depicts a flow chart of an exemplary embodiment of the methods according to the present invention. In step 302, the method determines a cost-effective number of fractures. In step 304, the method determines a geomechanical maximum number of fractures. In step 306, the method determines whether the cost-effective number of fractures or the geomechanical number of fractures is limiting. If the cost-effective number of fractures is limiting (e.g., if the method determines that geomechanically the formation can sustain more fractures than are cost-effective) then the method proceeds to step 308 where it creates a fracture layout based on the cost-effective number of fractures. If the geomechanical maximum number of fractures is limiting (e.g., if the method determines that geomechanically the formation can sustain less fractures than are cost-effective) then the method proceeds to step 310 where it creates a fracture layout based on the geomechanical maximum number of fractures.

Figure 2:
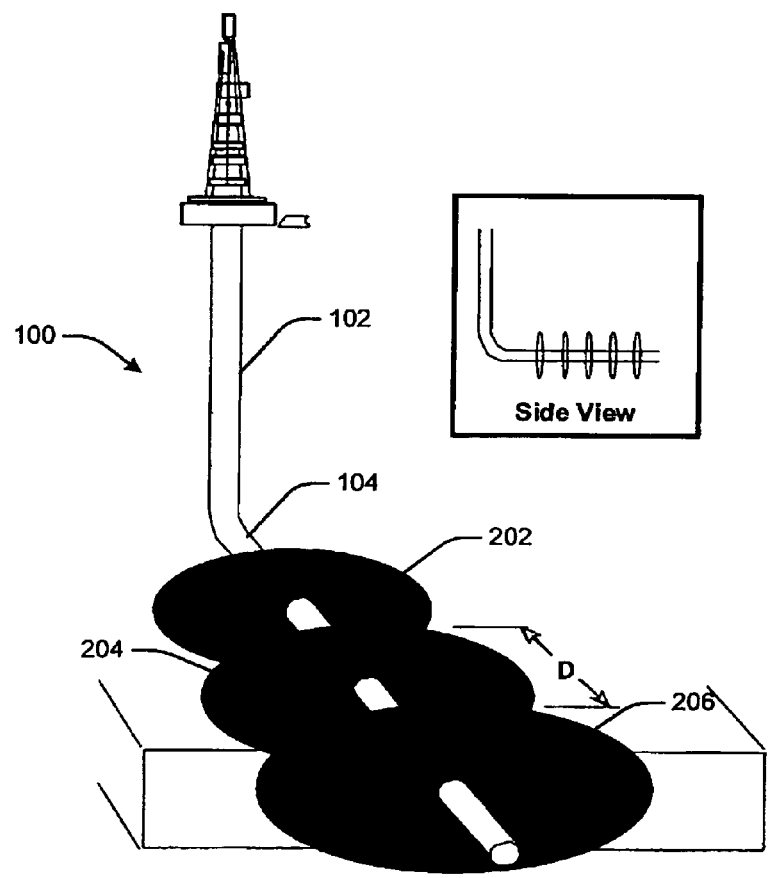
FIG. 2 is a perspective view of a well bore with a lateral having fractures.
Figure 4:
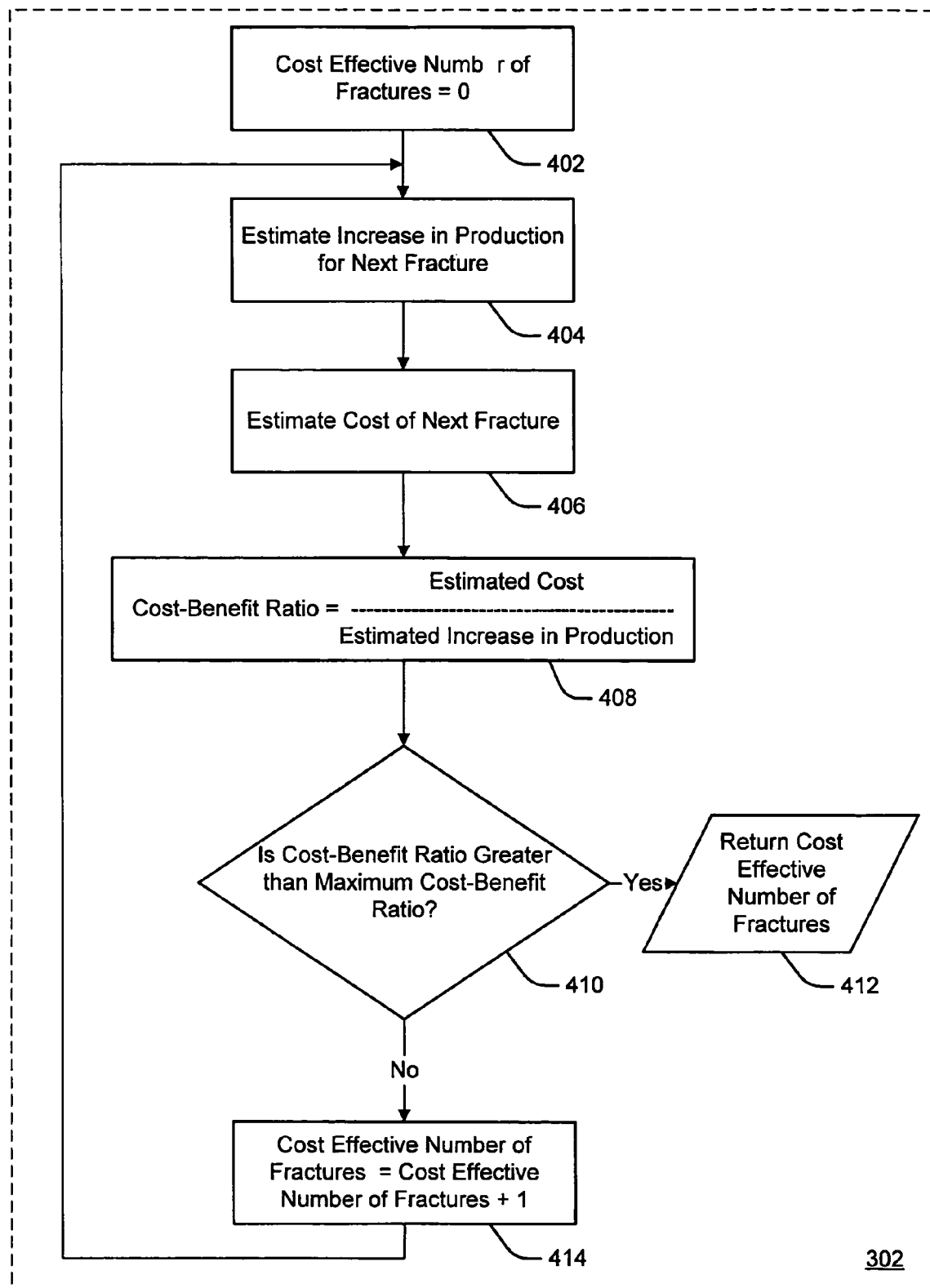
FIG. 4 illustrates a process flow diagram from an exemplary method of the present invention for estimating a cost-effective number of fractures.

Referring now to FIG. 4, step 302 of FIG. 3, in which the method according to the present invention determines the cost-effective number of fractures, is shown in greater detail. In step 402, the method sets the cost-effective number of fractures to zero. In step 404, the method estimates an increase in production for a next modeled fracture. Referring to FIG. 2, each of the fractures 202, 204, and 206 has an associated increase in production. Typically, the associated increase in production of a next modeled fracture is smaller than the increase in production associated with a previously modeled fracture. The increase in production of each additional fracture may be calculated based on any conventional method. In an exemplary embodiment of the present invention the method may consider some or all of the following criteria to determine the increase in production for the next fracture: physical properties of the formation (e.g., horizontal and vertical permeability, whether anisotropy is present, whether the formation if homogenous or heterogeneous, vertical lithological definitions including layers and shale streaks, and a leak of coefficient), physical properties of the reservoir (e.g., pressure, porosity, height, temperature, formation compressibility, fluid saturation, a type of fluid in the reservoir, and properties of the fluid in the reservoir), a definition of the stress field (e.g., a minimum horizontal stress in a pay zone and surrounding zones and a stress orientation of the formation), and mechanical properties of the rock in the formation (e.g., a Young's modulus due to the rock and a Poisson's ratio due to the rock).

Returning to FIG. 4, in step 406, the method estimates the cost of the next modeled fracture. The cost of each additional fracture is determined by adding all costs associated with the next modeled fracture. In step 408, the method calculates the cost-benefit ratio by dividing the estimated cost associated with the next modeled fracture by the estimated increase in production associated with the next modeled fracture. In block 410, the method determines if the cost-benefit ratio for the next modeled fracture is greater than a maximum cost-benefit ratio. The maximum cost-benefit ratio may be set by the user on a case-by-case basis or may be a default value. If the cost-benefit ratio for the next modeled fracture is greater than the maximum cost-benefit ratio the method proceeds to step 412, where the cost-effective number of fractures is returned. If the cost-benefit ratio for the next modeled fracture is not greater than the maximum cost-benefit ratio then the method proceeds to step 412, where the cost-effective number of fractures is increment by one and the routine is repeated by returning to step 404.

The methods of the present invention may use metrics other than cost-benefit ratio for optimizing the number of fractures. For example the method of the present invention may use other financial parameters including a net present value (NPV) of each fracture, a pay-out time of each of the fractures, or other financial parameters of creating each of the fractures.

Figure 5:
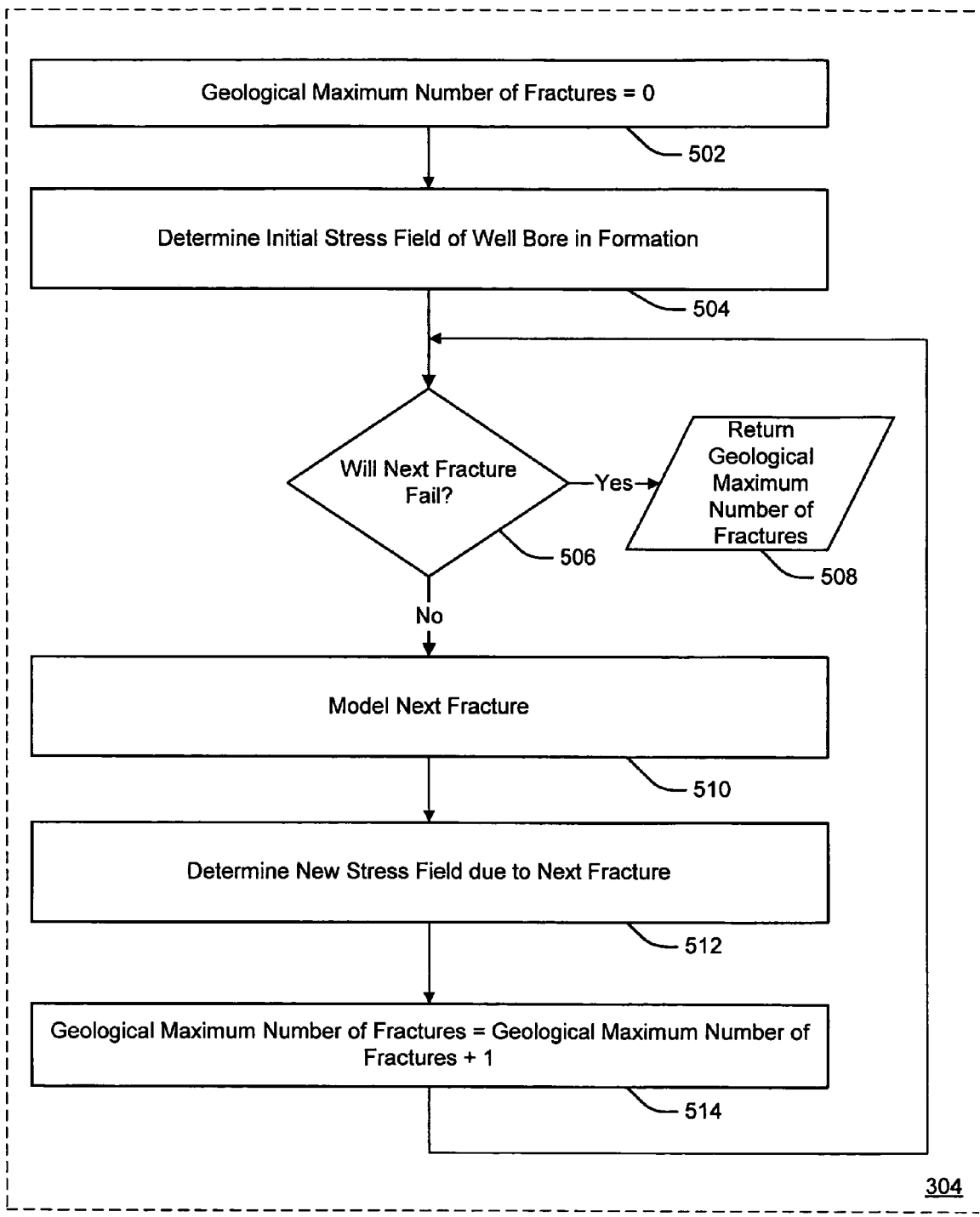
FIG. 5 illustrates a process flow diagram from an exemplary method of the present invention for estimating a geomechanical maximum number of fractures.

Referring now to FIG. 5, step 304 of FIG. 3, in which the method according to the present invention determines the geomechanical maximum number of fractures, is shown in greater detail. In step 502, the method sets the geological maximum number of fractures to zero. In step 504, the method determines an initial stress field of the well bore in the geological formation. In step 506, the method determines if a next modeled fracture will fail. If the next modeled fracture fails the method proceeds to step 508, where it returns the geological maximum number of fractures. If the next modeled fracture does not fail the method proceeds to step 510, where it models the next modeled fracture. In step 512, the method determines the new stress field due to the placement of the next modeled fracture. In step 514, the method increments the geological maximum number of fractures by one and returns to step 506.

Figure 1:
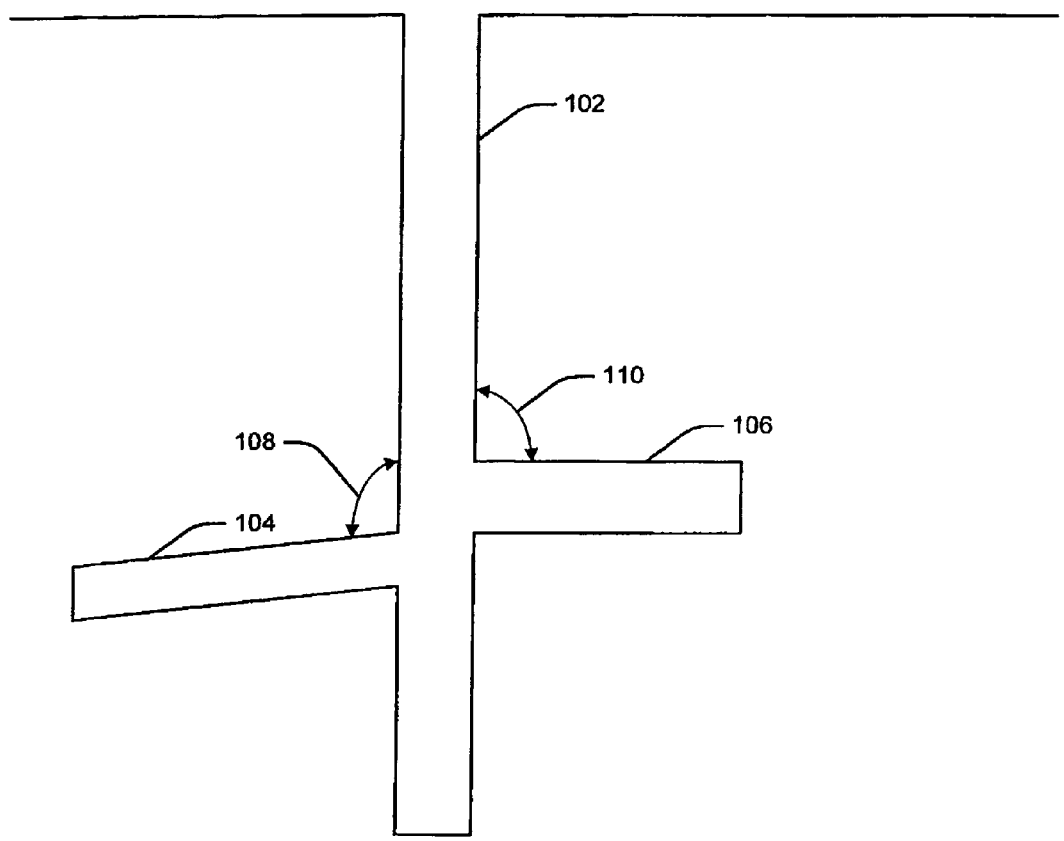
FIG. 1 depicts a side cross-sectional view of a subterranean well bore having laterals.

In step 504, the method determines an initial stress field of the well bore in the geological formation. Referring to FIG. 1, the initial stress field on well bore 100 may be input by the user or determined by any conventional method including sampled data from the formation including microfracturing test data, minifracturing test data, leak-off test (LOT) data, or logging data. In an exemplary embodiment of the present invention wavelet analysis is used to determine the stresses from microfracturing or minifracturing test data. The method then determines the orientation of the vertical portion 102 to the initial stress field. The orientation of the vertical portion 102 may be input by the user or the method may determine the orientation of the vertical portion 102. In an exemplary embodiment of the present invention, the method determines the orientation of the well bore 102 by assuming that the well bore 102 will be placed parallel to the direction of maximum stress (overburden stress) in the initial stress field. If the method is determining the placement of fractures in a horizontal well, the method determines the orientation of one of the laterals 104 or 106 to the initial stress field. The orientation of the one of the laterals 104 or 106 may be input by the user or may be determined by the method. In an exemplary embodiment of the present invention, the method determines the orientation of the one of the laterals 104 or 106 by assuming that the one of the laterals 104 or 106 will be orientated parallel to the direction of minimum stress in the initial geological formation.

Referring again to FIG. 5, in step 506, the method of the present invention determines if the next modeled fracture will fail. The next modeled fracture will fail when it propagates in a tortuous path, leading to higher fracture pressure and possibly to sand-out. For example, if a transverse fracture is placed in a lateral of a horizontal well bore, it will fail if it "turns" and begins to propagate in an axial direction. In another example, if an axial fracture is placed in a vertical well bore, it will fail if it "turns" and begins to propagate in a transverse direction. To predict if a fracture will fail, the method of the present invention calculates the geomechanical stresses at the point where the modeled fracture is initiated. To determine the point where the next modeled fracture will be initiated the method may receive input from the user or the method may determine the point where the next modeled fracture will be initiated automatically. In an exemplary embodiment of the present invention, the method assumes that the modeled fractures are equidistant from each other. The method calculates the geomechanical stresses at the point where the next modeled fracture is initiated by summing the initial stress field and the stress fields caused by any previous modeled fractures. After this summation, the method determines which principal component of geomechanical stress is smallest at the point where the modeled fracture is initiated. In the case of a transverse fracture in a lateral of a horizontal well bore, if the minimum stress is the vertical stress then the fracture is deemed to fail. In the case of an axial fracture in a vertical well bore, if the minimum stress is the horizontal stress the fracture is deemed to fail.

Figure 6:
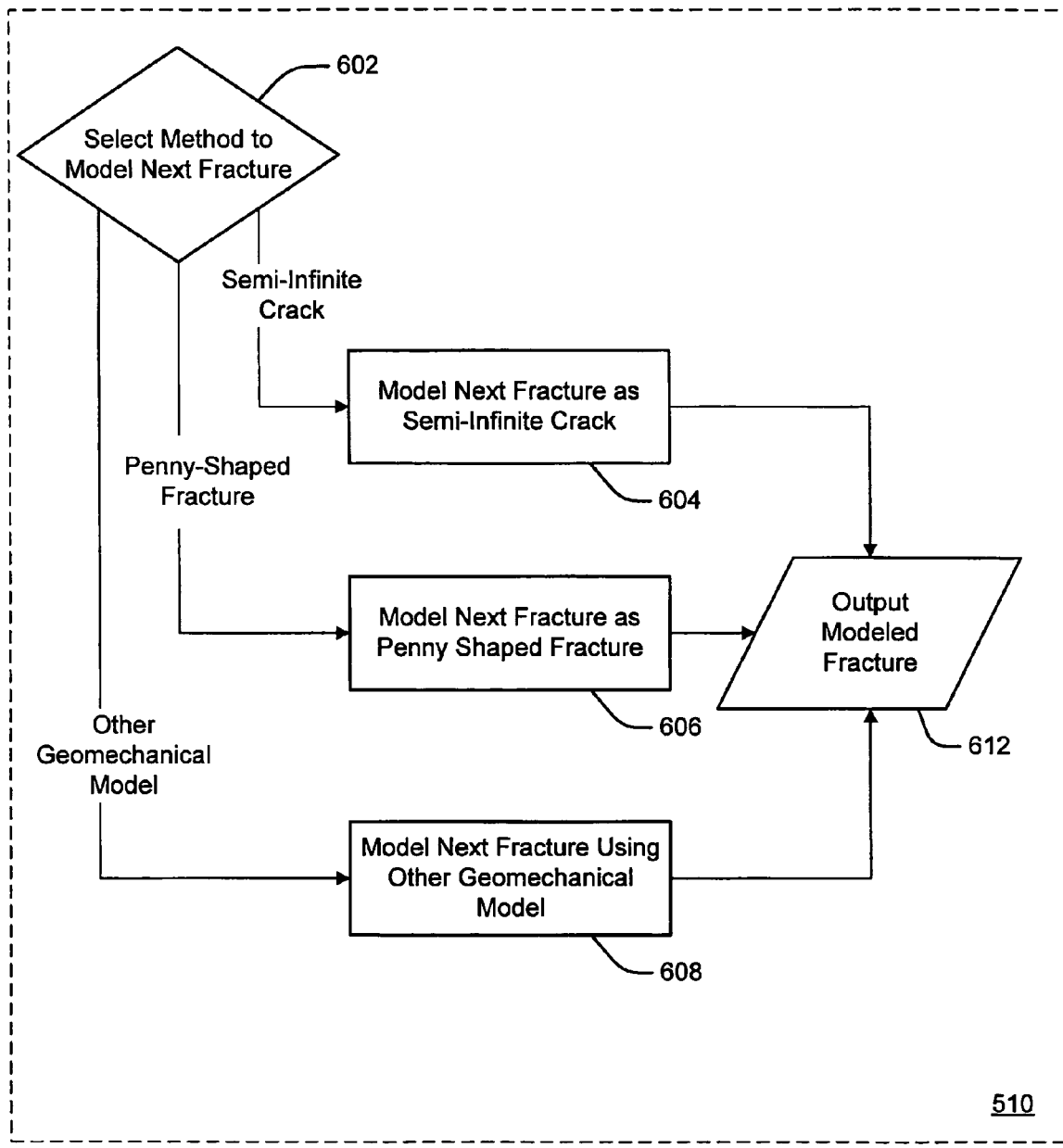
FIG. 6 illustrates a process flow diagram from an exemplary method of the present invention for modeling a fracture.

Referring now to FIG. 6, step 510, in which the exemplary method of the current invention models the next modeled fracture, is shown in greater detail. In step 502, the method selects a model to use to model the fracture. The selection of one of the models may be accomplished with or without user intervention. In an exemplary embodiment of the present invention, the user manually selects a model to use for modeling the next modeled fracture and inputs the dimension of the fracture. In another embodiment of the present invention, there is a default fracture model used to model the next modeled fracture. In yet another embodiment of the present invention, the method will determine which model is most appropriate for modeling the next modeled fracture based on the input characteristics of the next modeled fracture and previously modeled fractures (e.g., the distance between fractures, the size of the fracture, and the shape of the fracture). If the method chooses to model the next modeled fracture as a semi-infinite crack the method proceeds to step 604. If the method chooses to model the next modeled fracture as a penny-shaped fracture the method proceeds to step 606. If the method chooses to model the next modeled fracture using another geomechanical model the method proceeds to step 608.

Regardless of the method used to model the next modeled fracture, the method of the present invention may consider properties of the geological formation (e.g. type of material and presence of naturally occurring fractures) while modeling the next modeled fracture. In an exemplary embodiment of the present invention the method considers the presence of naturally occurring fractures in the geological formation. The presence of these fractures may reduce the stress induced by the previously modeled fractures on the next modeled fracture.

When modeling the next modeled fracture as a semi-infinite crack in step 604, the method of the present invention assumes that next modeled fracture is rectangular, with an infinite length, a finite height, and a width that is extremely small compared with the height and the length of the fracture. The height of the next modeled fracture may be input by the user or may be determined by the method. In an exemplary embodiment of the present invention, the method assumes that the modeled fractures have equal dimensions, and optimizes the size of the fractures to maximize the geological maximum number of fractures. Using these assumptions the method of the present invention calculates the stress field caused by the next modeled fracture using the following equations:

$$\frac{1}{2}(\sigma_y + \sigma_x) = p_o \left\{ \frac{r}{\sqrt{r_1 r_2}} \cos(\theta - 0.5\theta_1 - 0.5\theta_2) - 1 \right\}$$ (Equation 1)

$$\frac{1}{2}(\sigma_y - \sigma_x) = p_o \frac{2r\cos\theta}{H} \left( \frac{H^2}{4r_1 r_2} \right)^{3/2} \cos\left(\frac{3}{2}(\theta_1 + \theta_2)\right)$$ (Equation 2)

$$\tau_{xy} = -p_o \frac{2r\cos\theta}{H} \left( \frac{H^2}{4r_1 r_2} \right)^{3/2} \sin\left(\frac{3}{2}(\theta_1 + \theta_2)\right)$$ (Equation 3)

$$\sigma_z = \mu(\sigma_x + \sigma_y)$$ (Equation 4)

where: $\sigma_x$, $\sigma_y$, and $\sigma z$ are the components of stress in the x, y, and z directions respectively; $\tau_{xy}$ is the shearing stress; $p_o$ is the internal pressure at the point where the fracture is initiated; H is the height of the fracture; $\mu$ is Poisson's ratio; and where $z = re^{i\theta}$, $$z - \frac{1}{2}H = r_1 e^{i\theta_1}, \ z + \frac{1}{2}H = r_2 e^{i\theta_2}.$$

The method also records a predicted fracturing pressure associated with the next modeled fracture. In an exemplary embodiment of the present invention, the predicted fracturing pressure is equal to the internal pressure.

Figure 7:
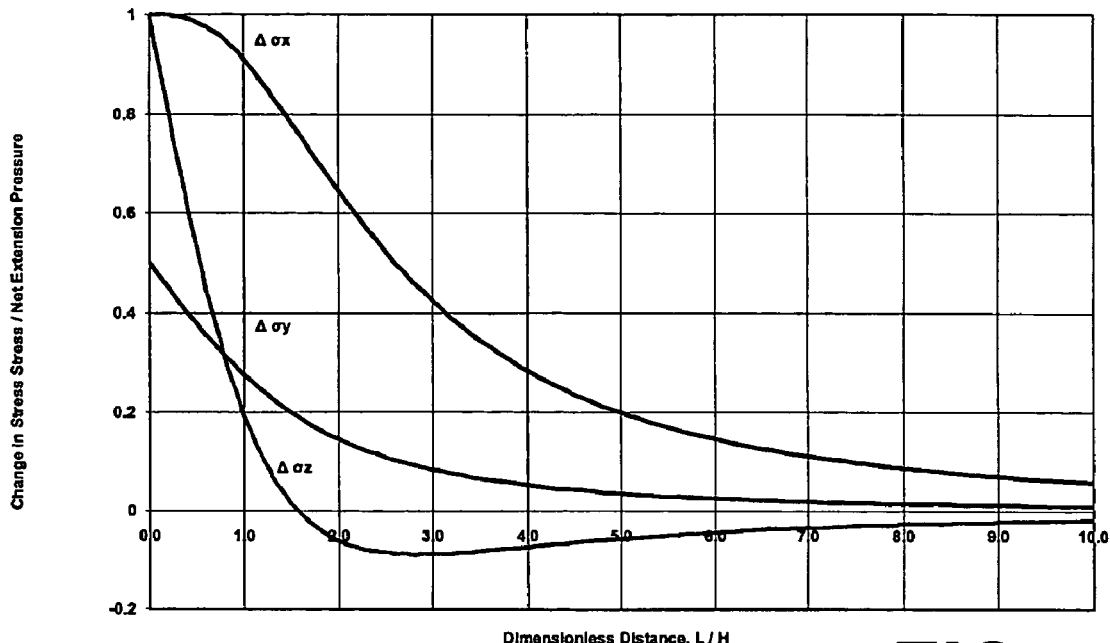
FIG. 7 is a graphical representation of the principal components of stress induced by a semi-infinite fracture versus dimensionless distance.

Referring now to FIG. 7, depicted is a graphical representation of the change in the three components of the principal stresses $\sigma_x$, $\sigma_y$, and $\sigma z$) versus the ratio L/H where L is a distance from the fracture along a line of symmetry and H is the height of the fracture. The line of symmetry is used because it represents the horizontal direction in case of creation of multiple fractures from a horizontal well. With respect to the coordinates of the functions plotted in FIG. 8, the x-direction is the direction perpendicular to the created fracture, the y-direction is the horizontal direction parallel to the fracture, and the z-direction is the vertical direction.

Referring again to FIG. 6, when modeling the next modeled fracture as a penny-shaped fracture in step 606, the method of the present invention assumes that the next modeled fracture is circular shaped and has finite dimensions. The height of the next modeled fracture may be input by the user or may be determined by the method. In an exemplary embodiment of the present invention, the method assumes that the modeled fractures have equal dimensions, and optimizes the size of the fractures to maximize the geological maximum number of fractures. Using these assumptions the method of the present invention calculates the stress field caused by the next modeled fracture using the following equations:

$$\sigma_r = \frac{2p_0}{\pi} \left(\frac{c}{2\delta}\right)^{\frac{1}{2}} \left[\frac{3}{4}\cos\frac{1}{2}\Psi + \frac{1}{4}\cos\frac{5}{2}\Psi\right]$$ (Equation 5)

$$\sigma_z = \frac{2p_0}{\pi} \left(\frac{c}{2\delta}\right)^{\frac{1}{2}} \left[\frac{5}{4}\cos\frac{1}{2}\Psi - \frac{1}{4}\cos\frac{5}{2}\Psi\right]$$ (Equation 6)

$$\tau_{zr} = \frac{p_0}{\pi} \left(\frac{c}{2\delta}\right)^{\frac{1}{2}} \sin\Psi \cos\frac{3}{2}\Psi$$ (Equation 7)

$$\sigma_\theta = \frac{4\sigma p_0}{\pi} \left(\frac{c}{2\delta}\right)^{\frac{1}{2}} \cos\frac{1}{2}\Psi$$ (Equation 8)

where: $\sigma_r$, $\sigma_z$, and $\sigma_\theta$ are the polar components of stress; $\tau_{zr}$ is the shearing stress; $p_o$ is the internal at the point where the fracture is initiated; $z = re^{i\theta}$, $z - c = r_1 e^{i\Theta_1}$, and $z + c = r_2 e^{i\Theta_2}$, where the fracture extends from $z = c$ to $z = -c$; and where a two-dimensional projection of the fracture is defined by the function $\eta^2 = -b\xi$, where the origin of the coordinates is the edge of the fracture, $\xi$ is the axis along the fracture, $\eta$ is the axis perpendicular to the fracture, $\xi = \delta \cos \Psi$, and $\eta = \delta \sin \Psi$. The equations are provided in this coordinate set for brevity. One of ordinary skill in the art with the benefit of this disclosure can convert the coordinates and solve for $\sigma_x$, $\sigma_y$, and $\sigma_z$. The method also records a predicted fracturing pressure associated with the next modeled fracture. In an exemplary embodiment of the present invention, the predicted fracturing pressure is equal to the internal pressure.

Figure 8:
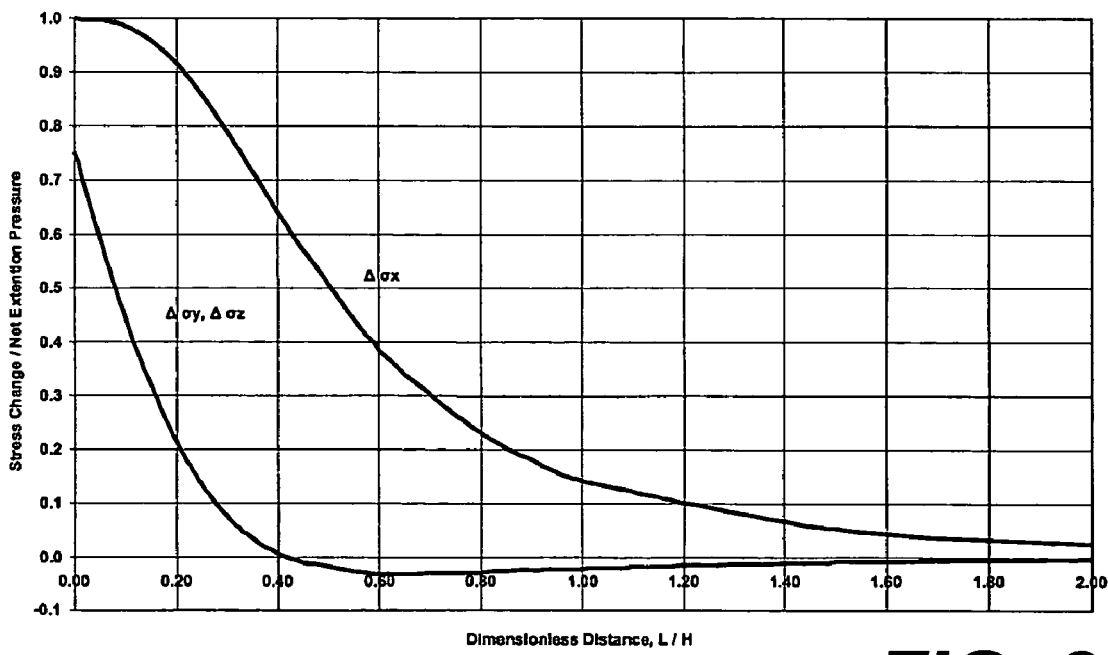
FIG. 8 is a graphical representation of the principal components of stress induced by a penny-shaped fracture versus dimensionless distance.

Referring now to FIG. 8, depicted is a graphical representation of the change in the three principal stresses ($\sigma_x$, $\sigma_y$, and $\sigma_z$) versus the dimensionless distance L/H where L is the distance from the fracture and H is the diameter of the fracture for the penny-shaped fracture. With respect to the coordinates of the functions plotted in FIG. 9, the x-direction is the direction perpendicular to the created fracture, the y-direction is the horizontal direction parallel to the fracture, and the z-direction is the vertical direction.

Figure 9:
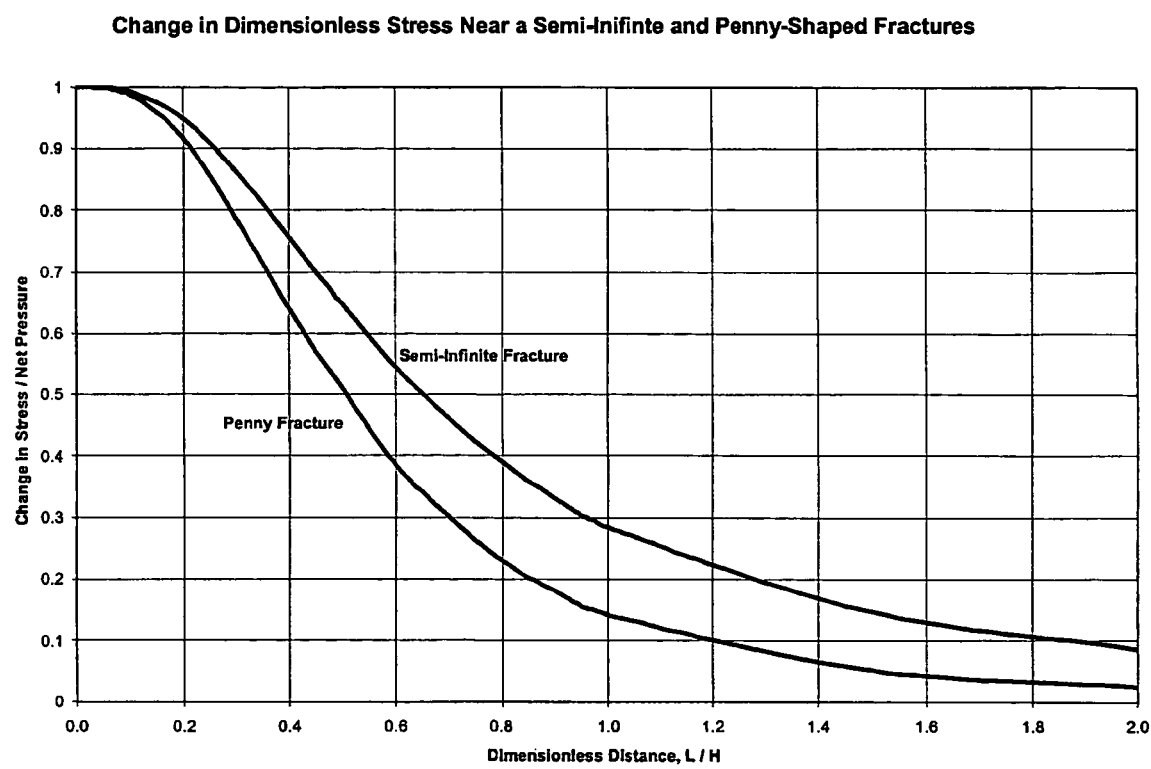
FIG. 9 is a graphical representation of the principal components of stress induced by a semi-infinite fracture and a penny-shaped fracture versus dimensionless distance.

Referring now to FIG. 9, depicted is a graphical representation of the change in minimum horizontal stress (the stress component perpendicular to the fracture) due to the creation of a semi-infinite fracture versus dimensionless distance from the fracture and the change in minimum horizontal stress due to the creation of a penny-shaped fracture versus dimensionless distance from the fracture. The dimensionless distance from the fracture is the ratio of the distance from the fracture versus the height or diameter of the fracture.

Referring again to FIG. 6, in step 608, the method according to the present invention may use other geomechanical models to model the next modeled fracture. In one exemplary embodiment of the present invention, the method may model the fractures as both a penny-shaped fracture (as in step 604) and as a semi-infinite fracture (as in step 602) and interpolate between the modeled stress fields (penny-shaped and semi-infinite) based on one or more properties of the next modeled fracture (e.g. the length of the next modeled fracture or the shape of the next modeled fracture) to determine a stress field for the modeled fracture. In an exemplary embodiment of the present invention the dimensions of the next modeled fracture are input by the user. In another exemplary embodiment of the present invention, the method assumes that the modeled fractures have equal dimensions, and optimizes the size of the fractures to maximize the geological maximum number of fractures. The method may assign a weight to the length and diameter/height of the fracture. In that case, stress field induced by a longer fracture will more closely resemble the stress field induced by a semi-infinite fracture than a shorter fracture, assuming all other dimensions of the longer and shorter fractures are equivalent. The method also records a predicted fracturing pressure associated with the next modeled fracture. In an exemplary embodiment of the present invention, the predicted fracturing pressure is equal to the internal pressure.

Referring again to FIG. 5, the method determines the new stress field due to the next modeled fracture. The method sums the initial stress field, the stress fields caused by previously modeled fractures, and the stress field case by the next modeled fracture. In an exemplary embodiment of the present invention, it is assumed that the medium is linearly elastic and that the governing model of the stress field (comprising the differential equations, boundary conditions, and initial conditions) is linear, the principle of superposition is applicable. Thus, the method of the present invention may calculate the new stress field by summing the stresses caused by each of the fractures on the specific point in the formation.

In another exemplary embodiment of the present invention, the method may calculate the stress field by using superposition and by adding the initial stress field, the stress fields caused by each of previously modeled fractures, and the next modeled fracture, sequentially. This has the effect of predicting a greater change in the minimum stress because each modeled fracture will be created against a higher minimum stress (due to the presence of the previously modeled stress fields). Because the minimum stress will be higher for each subsequent fracture, the internal pressure at the point where the subsequent fracture is initiated will be higher. Consequently, a higher fracturing pressure will be required to create each subsequent fracture overcome the internal pressure of the formation. The increase in $p_o$ will, in turn, lead to a greater change in the minimum stress caused by the next modeled fracture.

The method may also calculate the new stress field due to the creation of fractures in multiple laterals of a single well. For example, referring to FIG. 1, fractures may be initiated in laterals 104 and 106. The method may calculate the new stress field for fractures initiated in lateral 106 including the stress field induced by fractures 202, 204, and 206 (shown in FIG. 2) in lateral 104. The method may also calculate the stress field due to adjacent well bores or fractures in adjacent well bores around well bore 102.

Referring again to FIG. 3, in step 308, the method uses the fracture layout based on the cost-effective number of fractures. The method creates the fracture layout such that it has the cost-effective number of fractures. The method may use any conventional method to produce the fracture layout. The fracture layout may be generated on a computer and output to a display device or printer. The fracture layout may be controlled by the input of the user or the method may determine the fracture layout automatically. In an exemplary embodiment of the present invention, the method will create the fracture layout so that the fractures are spaced equally from each other. The size of the fractures may be input by the user or the method may determine the size of the fractures automatically.

In step 310, the method uses the fracture layout based on the geomechanical maximum number of fractures. The method creates the fracture layout such that it has the geomechanical maximum number of fractures. The method may use any conventional method to produce the fracture layout. The fracture layout may be generated on a computer and output to a display device or printer. The fracture layout may be controlled by the input of the user or the method may determine the fracture layout automatically. In an exemplary embodiment of the present invention, the method will create the fracture layout so that the fractures are spaced equally from each other. The size of the fractures may be input by the user or the method may determine the size of the fractures automatically.

Figure 10:
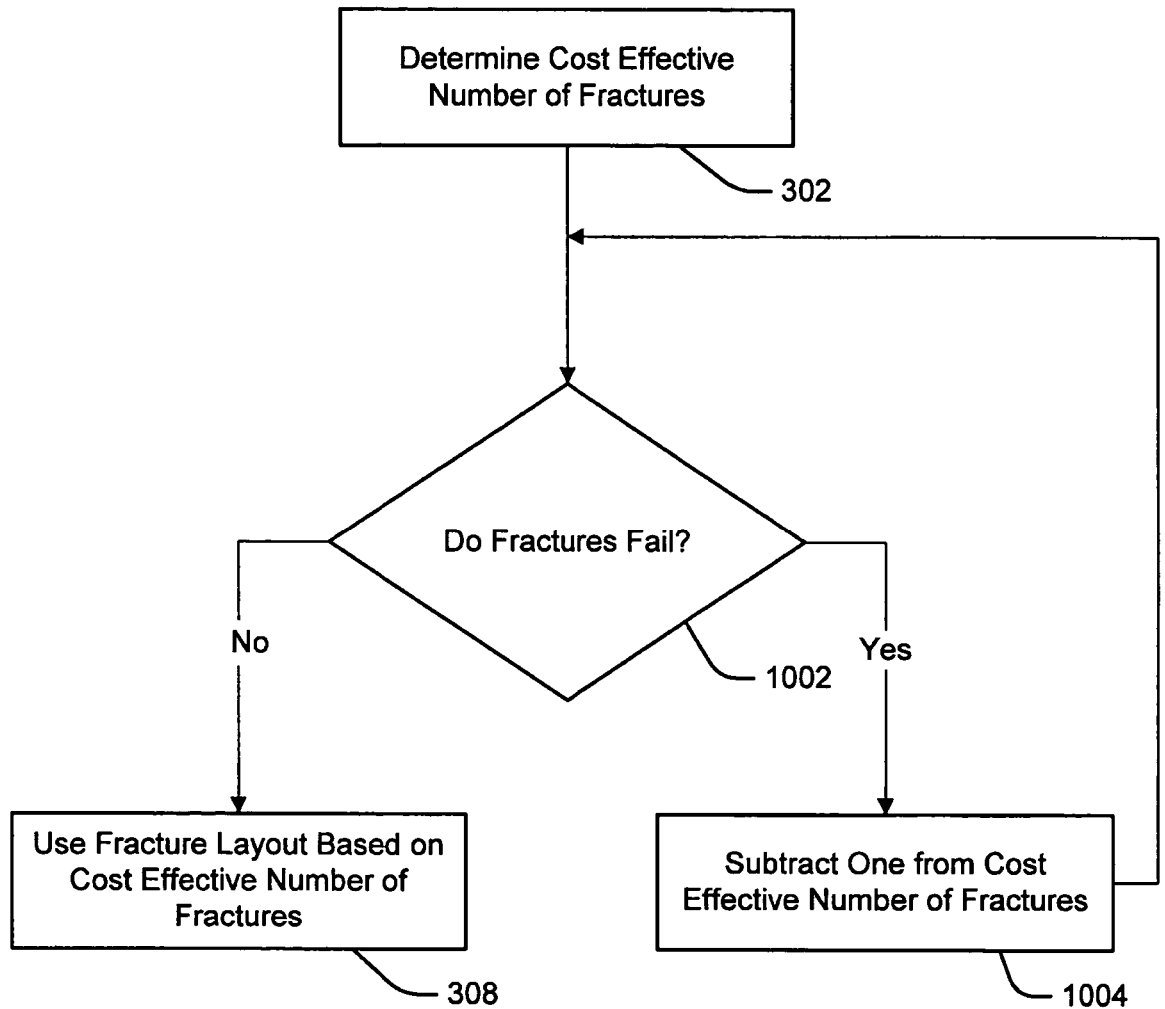
FIG. 10 illustrates a process flow diagram from an exemplary method of the present invention for creating a fracture layout.

FIG. 10 depicts a flow chart of another exemplary embodiment of the methods of present invention. In step 302 (discussed above with respect to FIG. 3) the method determines a cost-effective number of fractures. In step 1004, the method determines if the cost-effective number of fractures fail. If the cost-effective number of fractures fails, the method proceeds to step 1104, where the cost-effective number of fractures is decremented by one and the method proceeds to step 1002. If the cost-effective number of fractures do not fail the method proceeds to block 308 (described above with respect to FIG. 3) where it creates a fracture layout based on the cost-effective number of fractures.

Figure 11:
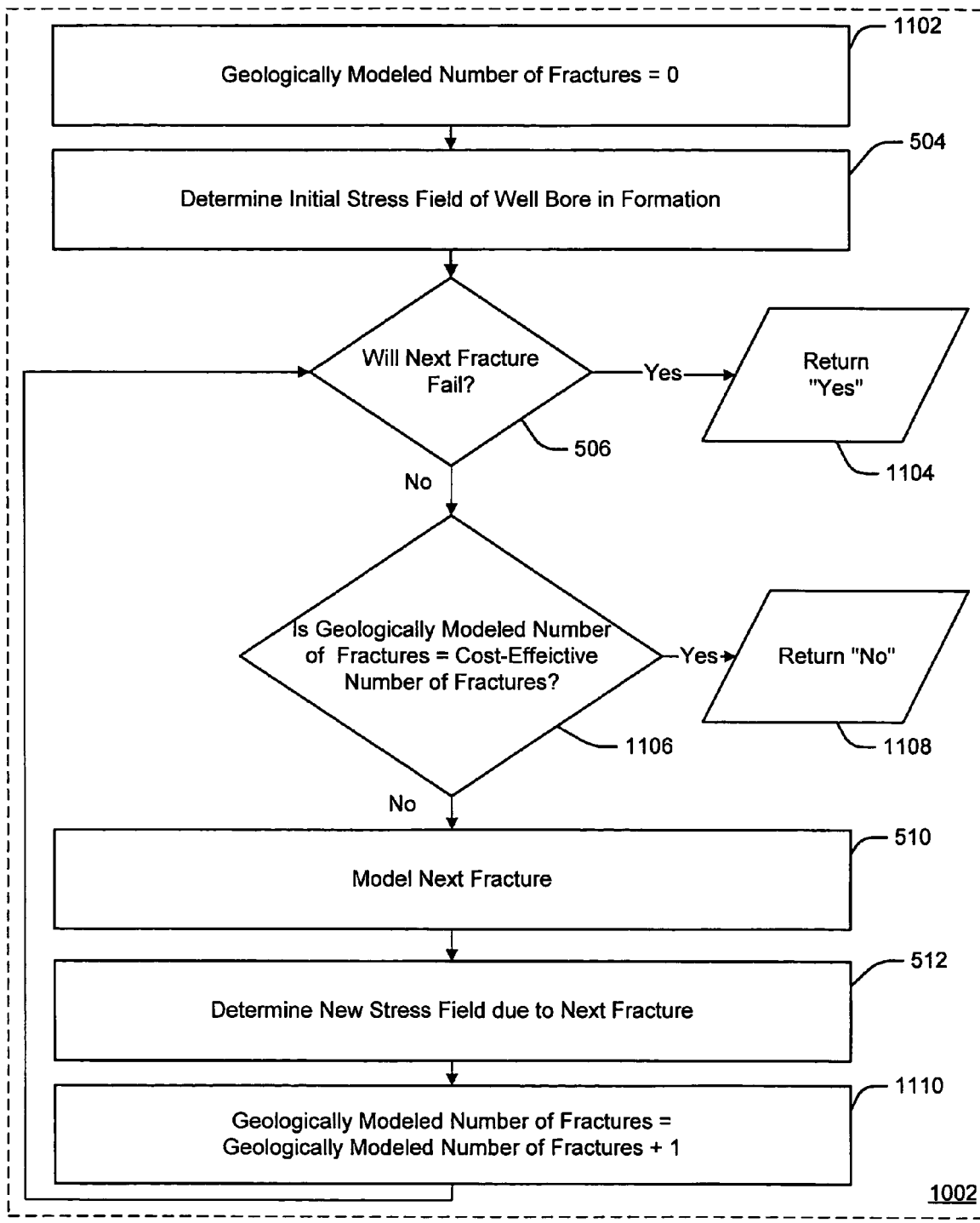
FIG. 11 illustrates a process flow diagram from an exemplary method of the present invention for determining whether modeled fractures fail.

Referring now to FIG. 11, step 1002 of FIG. 10, in which the method according to the present invention determines whether the cost-effective number fractures will fail, is shown in greater detail. In step 1102, the method sets a geologically modeled number of fractures to zero. In step 504, the method determines the initial stress field of the well bore in the geological formation, as described with respect to FIG. 5. In step 506, the method determines if the next modeled fracture fails, as described with respect to FIG. 5. If the next modeled fracture does fail, the method proceeds to step 1104 where it returns "Yes." If the next modeled fracture does not fail, the method proceeds to step 1106. In step 1106, the method determines if the geologically modeled number of fractures is equal to the cost-effective number of fractures. If the geologically modeled number of fractures is equal to the cost-effective number of fractures the method proceeds to step 1108, where it returns "No." If the geologically modeled number of fractures is not equal to the cost-effective number of fractures, the method proceeds to step 510 where it models the next modeled fracture, as described with respect to FIG. 5. In step 512, the method determines the new stress field due to the next modeled fracture, as described with respect to FIG. 5. In step 1110, the method increments the geologically modeled number of fractures by one and returns to step 506.

Figure 12:
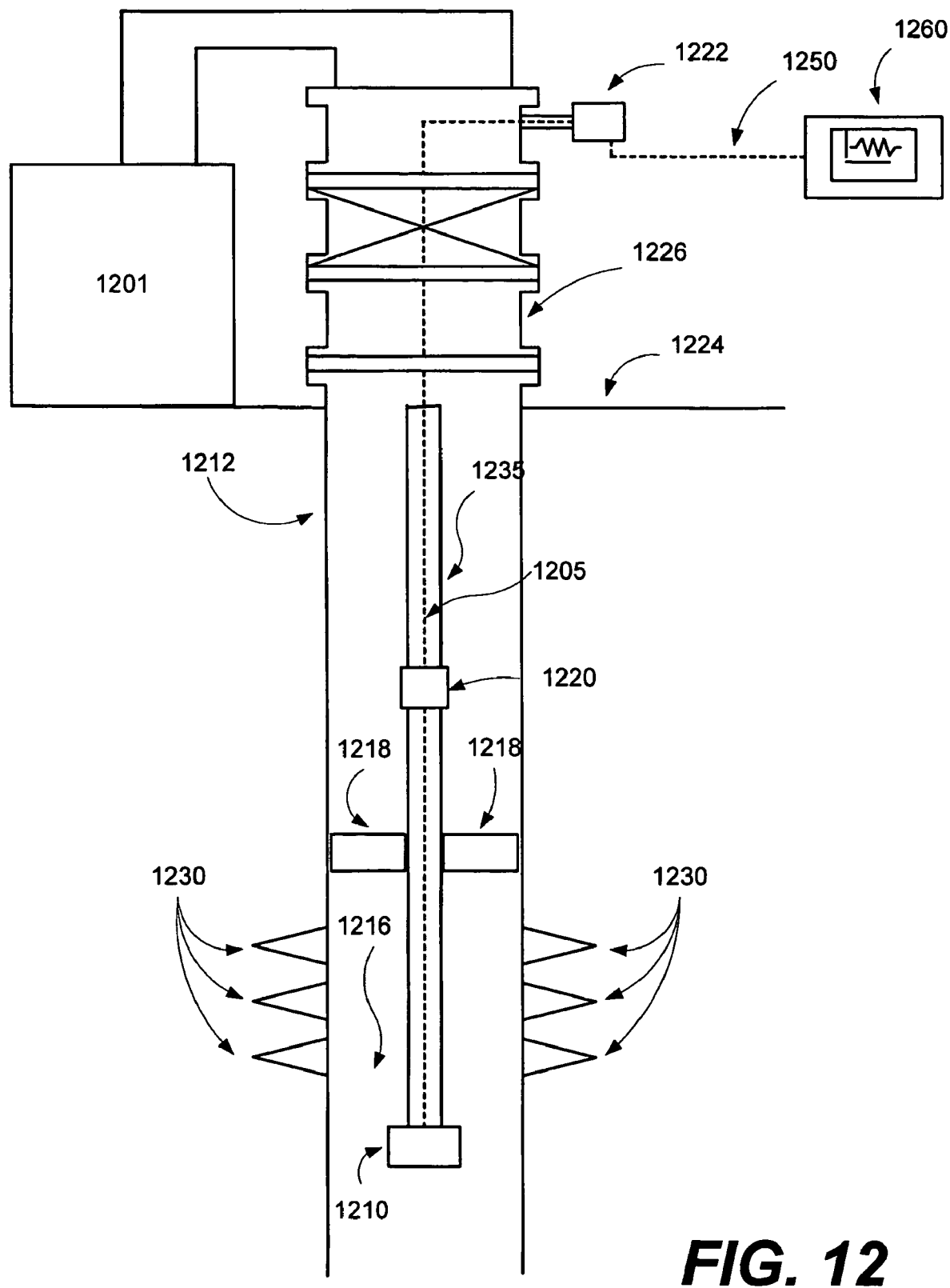
FIG. 12 depicts a side cross-sectional view of a subterranean well bore wherein fluid may be injected, and the results of such injection monitored, according to an exemplary embodiment of the present invention.

FIG. 12 depicts a schematic representation of a subterranean well bore 1212 through which a fluid may be injected into a region of the subterranean formation surrounding well bore 1212 such that physical property data (e.g., pressure signals, temperature signals, and the like) are generated. The fluid may be of any composition suitable for the particular injection operation to be performed. For example, where the methods of the present invention are used in accordance with a fracture stimulation treatment, a fracturing fluid may be injected into a subterranean formation such that a fracture is created or extended in a region of the formation surrounding well bore 1212 and generates pressure signals. The fluid may be injected by injection device 1201 (e.g., a pump). Physical property data such as pressure signals may be generated during subterranean injection processes, for reasons including the fact that the injected fluid is being forced into the formation at a high pressure. The physical property data may comprise an actual fracturing pressure, an actual fracturing rate, and an actual fracturing time.

The physical property data may be sensed using any suitable technique. For example, sensing may occur downhole with real-time data telemetry to the surface, or by delayed transfer (e.g., by storage of data downhole, followed by subsequent telemetry to the surface or subsequent retrieval of the downhole sensing device, for example). Furthermore, the sensing of the physical property data may be performed at any suitable location, including, but not limited to, the tubing 1235 or the surface 1224. In general, any sensing technique and equipment suitable for detecting the desired physical property data with adequate sensitivity and/or resolution may be used. FIG. 12 depicts an exemplary embodiment of the present invention wherein the physical property data are sensed by a sensing device 1210 resident within well bore 1212. The sensing device 1210 may be any sensing device suitable for use in a subterranean well bore. An example of a suitable sensing device 1210 is a pressure transducer disclosed in U.S. Pat. No. 6,598,481, which is hereby incorporated herein for all purposes. In certain exemplary embodiments of the present invention, the sensing device 1210 comprises a pressure transducer that is temperature-compensated. In one exemplary embodiment of the present invention, the sensing device 1210 is lowered into the well bore 1212 and positioned in a downhole environment 1216. In certain exemplary embodiments of the present invention, the sensing device 1210 may be positioned below perforations 1230. In certain exemplary embodiments of the present invention, the downhole environment 1216 is sealed off by packer 1218, wherein access is controlled with a valve 1220.

The physical property data is ultimately transmitted to the surface by transmitter 1205 at a desired time after having been sensed by the sensing device 1210. As noted above, such transmission may occur immediately after the physical property data is sensed, or the data may be stored and transmitted later. Transmitter 1205 may comprise a wired or wireless connection. In one exemplary embodiment of the present invention, the sensing device 1210, in conjunction with associated electronics, converts the physical property data to a first electronic signal. The first electronic signal is transmitted through a wired or wireless connection to signal processor unit 1222, preferably located above the surface 1224 at wellhead 1226. In certain exemplary embodiments of the present invention, the signal processor unit 1222 may be located within a surface vehicle (not shown) wherein the fracturing operations are controlled. Signal processor unit 1222 may perform mathematical operations on a first electronic signal, further described later in this application. In certain exemplary embodiments of the present invention, signal processor unit 1222 may be a computer comprising a software program for use in performing mathematical operations. An example of a suitable software program is commercially available from The Math Works, Inc., of Natick, Mass., under the tradename "MATLAB." In certain exemplary embodiments of the present invention, output 1250 from signal processor unit 1222 may be plotted on display 1260.

Figure 13:
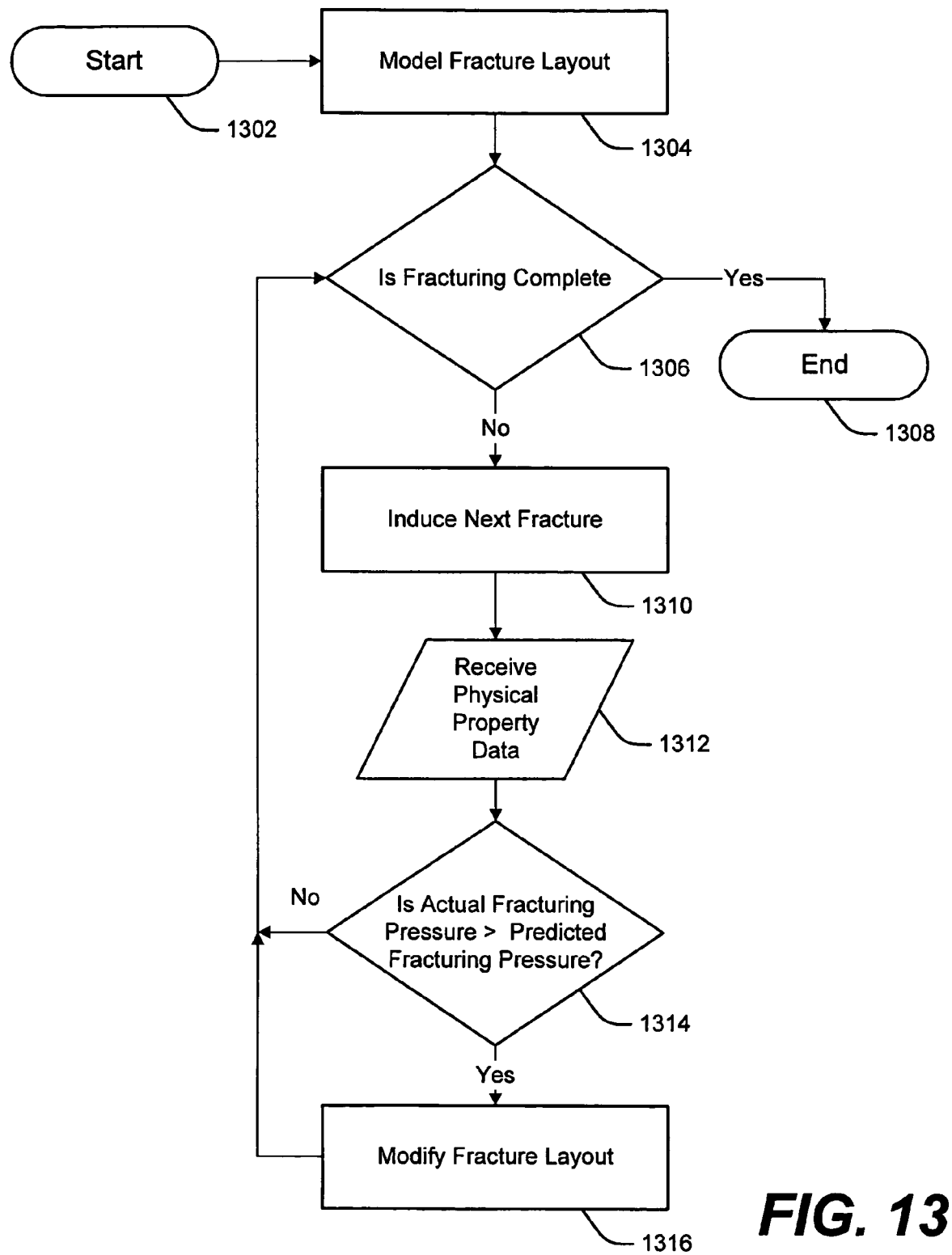
FIG. 13 illustrates a process flow diagram from an exemplary method of the present invention for fracturing based on a fracture layout.

FIG. 13 depicts a flow chart of another exemplary embodiment of the methods according to the present invention. In step 1302, the method starts. In step 1304, the method creates a fracture layout. Step 1304 may be accomplished using the methods described with respect to FIG. 3 or 11 or any other method for creating a fracture layout. In step 1306, the method determines if the fracturing is complete. If the fracturing is complete the method proceeds to step 1308, where it ends. If the fracturing is not complete the method proceeds to step 1310, where a next fracture is induced in the subterranean formation. In step 1312, the method receives physical property data from sensing device 1210, the physical property data comprising an actual fracturing pressure and may additionally comprise an actual fracturing rate (e.g. a fracturing fluid injection rate), an actual fracturing time, and any surface deformation (e.g. a fracture-induced surface trough). In step 1314, the method determines if the actual fracturing pressure is greater than the predicted fracturing pressure associated with the next actual fracture. If the actual fracturing pressure is greater than the predicted fracturing pressure, the method proceeds to step 1316, where it modifies the fracture layout and returns to step 1306. If the actual fracturing pressure is not greater than the predicted fracturing pressure, the method returns to step 1306.

Figure 14:
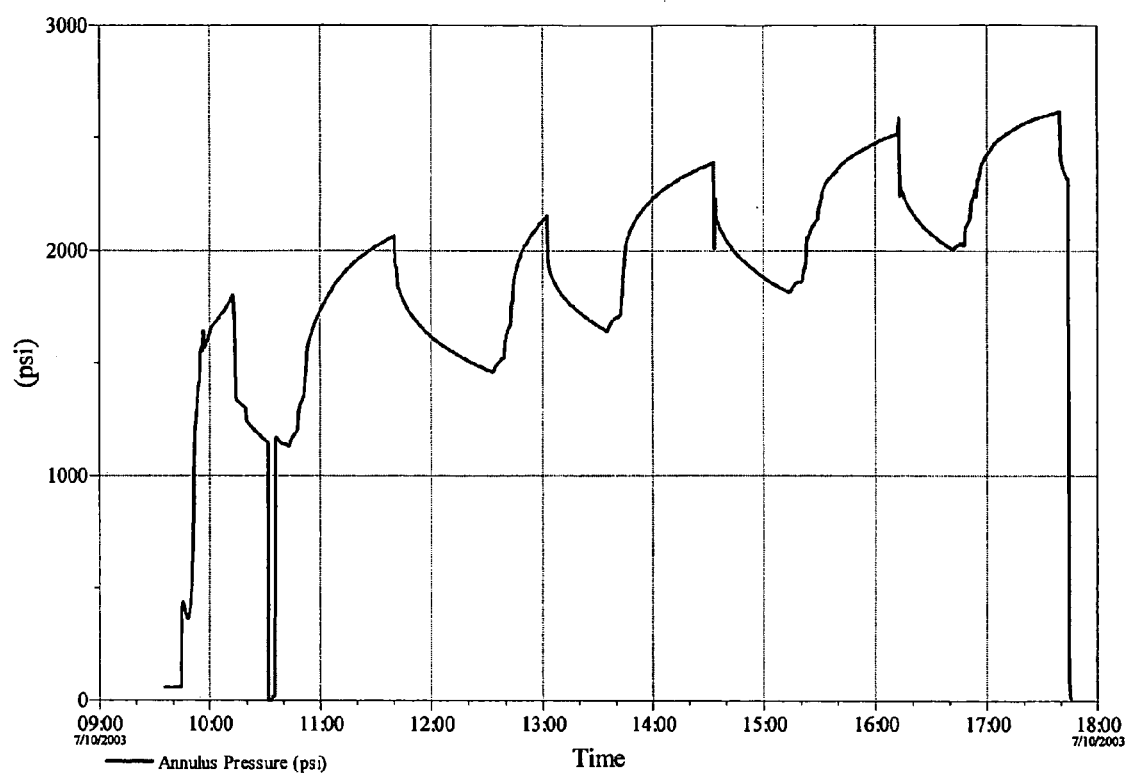
FIG. 14 is a graphical representation of instantaneous shut-in pressure versus time for the creation of six fractures.
Figure 15:
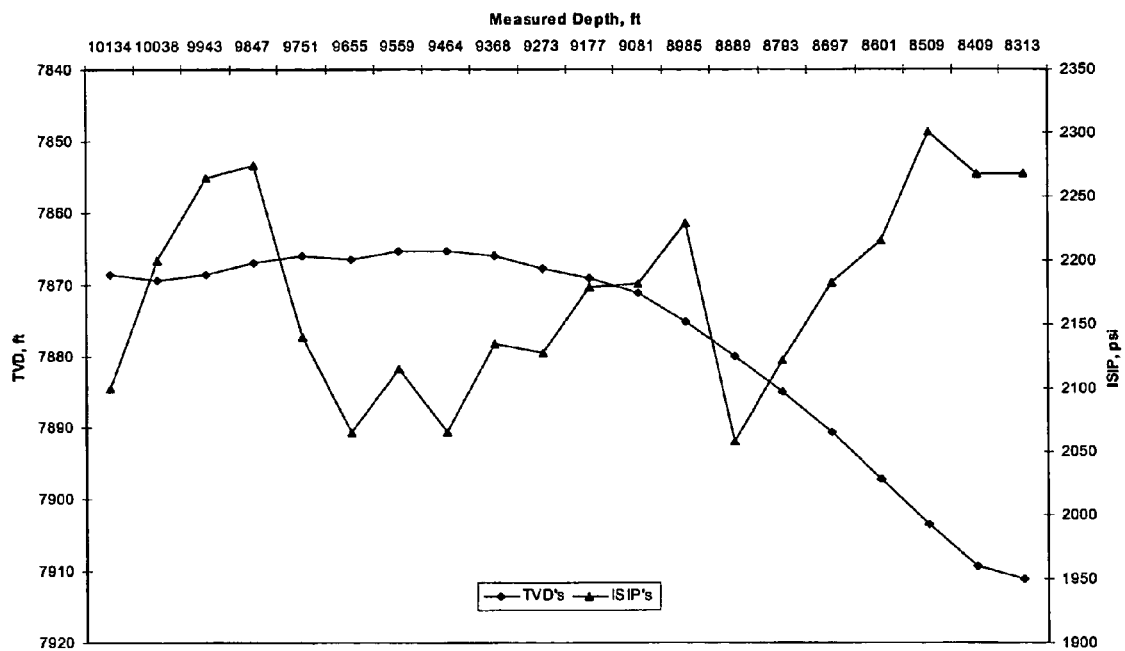
FIG. 15 is a graphical representation of instantaneous shut-in pressure and true vertical depth versus measured depth for the creation of twenty fractures.
Figure 16:
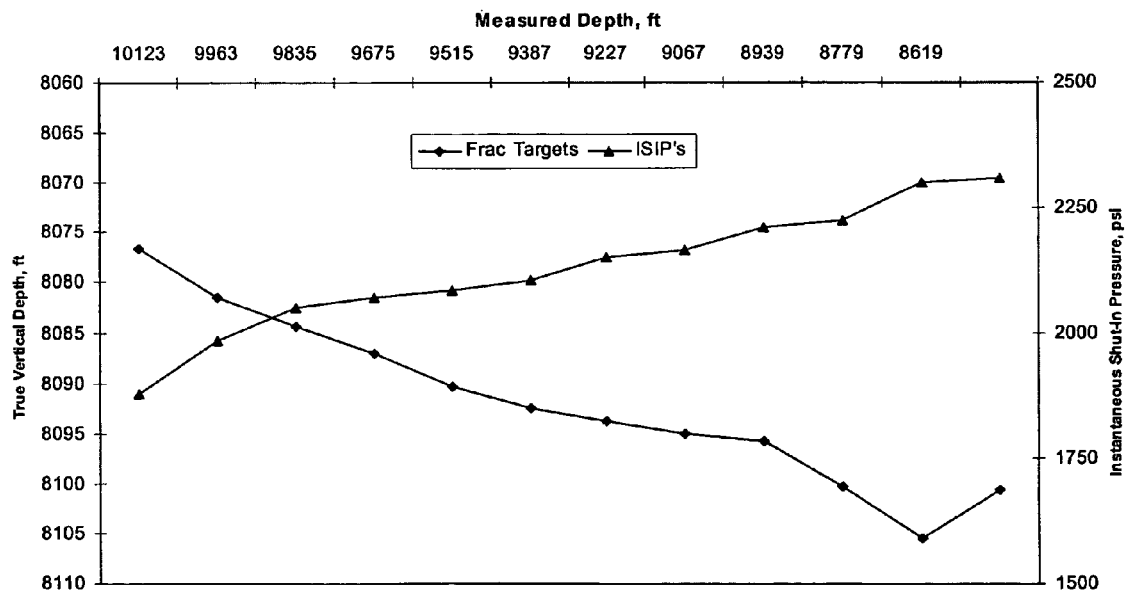
FIG. 16 is a graphical representation of instantaneous shut-in pressure and true vertical depth versus measured depth for the creation of twelve fractures.

In step 1312, the method according to the present invention receives physical property data from sensing device 1210. An example of received physical property data is shown in FIG. 14, which depicts fracturing pressure (psi) versus time for the creation of six fractures in a chert reservoir. The fracturing pressure increases from about 1576 psi for the first fracture to about 2600 psi for the sixth fracture. Another example of received physical property data is shown in FIG. 15, which depicts true vertical depth (TVD) in feet and instantaneous shut-in pressure (ISIP) in psi versus measured depth in feet for twenty fractures in a first shale reservoir. Yet another example of received physical property data is shown in FIG. 16, which depicts true vertical depth (TVD) in feet and instantaneous shut-in pressure (ISIP) in psi versus measured depth in feet for twelve fractures in a second shale reservoir.

Returning to FIG. 13, in step 1316, the method of the present invention modifies the fracture layout based on the actual fracturing pressure. In an exemplary embodiment of the present invention, the method will reevaluate the fracture layout based on the actual fracturing pressure. The method will remodel fractures that have not been induced. The method may use the method disclosed in step 304 of FIG. 3. The method will substitute the actual fracturing pressure for the internal pressure of the next modeled fracture. Based on the reevaluation of the fracture layout the method may perform any of the following actions: decrease the number of fractures, increase the distance between fractures, or decrease the size of the fractures. For example, referring to FIG. 2, assume that fracture 206 is the first fracture induced in lateral 104. If the actual fracturing pressure associated with fracture 206 is greater than the predicted fracturing pressure the method may increase the space between fracture 206 and fracture 204. Assuming the actual fracturing pressure is much greater than the predicted fracturing pressure, the method may omit fracture 204 entirely, reducing the number of fractures in lateral 104.

The methods disclosed above may be carried out by a computer having a processor, a memory, and storage. The methods may be represented as instructions stored in software run on the computer. Additionally, the method may be stored in ROM on the computer.

Therefore, the present invention is well-adapted to carry out the object and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of optimizing a number, placement and size of fractures separated from each other along a length of a well bore arranged in a subterranean formation, the method implemented in a computer system comprising at least one processor and a memory, the method comprising the steps of:
   a) modeling each fracture so as to provide modeled dimensions and a location for each fracture along the length of the well bore;
   b) determining an initial stress field induced by the fractures and based on the modeled dimensions and the location of each fracture;
   c) modeling a new fracture and determining a new fracture stress field based on the new fracture;
   d) determining a new stress field based on a combination of the initial stress field and the new fracture stress field;

e) determining a geomechanical maximum number of fractures based on the new stress field; and f) generating an optimized number, placement and size for two or more fractures in a subterranean formation, where generating the optimized number, placement and size for two or more fractures in a subterranean formation is based, at least in part, on one or more of:

the geomechanical maximum number of fractures; and the new stress field based on the combination of the initial stress field and the new fracture stress field.

2. The method according to claim 1, further comprising creating a fracture in the subterranean formation, wherein steps (a) through (e) are performed prior to creating the fracture in the subterranean formation.

3. The method according to claim 1, further comprising the steps of:

determining a cost-effective number of fractures;

determining an optimum number of fractures, where the optimum number of fractures is the maximum cost-effective number of fractures that does not exceed the geomechanical maximum number of fractures.

4. The method according to claim 1, further comprising the step of placement the fractures a uniform distance from each other.

5. The method according to claim 1, further comprising the step of creating the fractures with a uniform size.

6. The method according to claim 1, further comprising the steps of:

creating one or more fractures in the subterranean formation; and repeating steps (a) through (e) after each fracture is created.

7. The method according to claim 6, wherein the repeating step comprises the steps of gathering and analyzing real-time fracturing data for each fracture created.

8. The method according to claim 7, wherein the well bore is coupled to a wellhead and includes a tubing, the well bore comprising a downhole section, and wherein the gathering of real-time fracturing data comprises the steps of:

(i) measuring a fracturing pressure while creating a current fracture;

(ii) measuring a fracturing rate while creating the current fracture; and (iii) measuring a fracturing time while creating the current fracture.

9. The method according to claim 8, wherein the measuring of fracturing pressure is accomplished using one or more transducers located at the wellhead.

10. The method of claim 8, wherein the measuring of fracturing pressure is accomplished using one or more transducers located down hole.

11. The method according to claim 8, wherein the fracturing pressure is measured in the tubing.

12. The method according to claim 7, wherein analyzing of real-time fracturing data comprises the steps of:

determining an additional stress field, based on the real-time fracturing data; and comparing the additional stress field with the new stress field.

13. The method according to claim 12, further comprising the step of decreasing the number of fractures in response to the real-time fracturing data.

14. The method according to claim 12, further comprising the step of increasing the distance between the fractures in response to the real-time fracturing data.

15. The method according to claim 12, further comprising the step of adjusting the size of the fractures in response to the real-time fracturing data.

16. The method according to claim 1, wherein the well bore comprises a generally vertical portion.

17. The method according to claim 16, wherein the well bore further comprises one or more laterals.

18. A computer program stored in a signal processor having a memory for optimizing a number, placement and size of fractures separated from each other along a well bore in a subterranean formation, comprising executable instructions that cause at least one processor to:

a) model each fracture so as to provide modeled dimensions and a location for each fracture along the length of the well bore;

b) determine an initial stress field induced by the fractures and based on the modeled dimensions and the location of each fracture;

c) model a new fracture and determining a new fracture stress field based on the new fracture;

d) determine a new stress field based on a combination of the initial stress field and the new fracture stress field;

e) determine a geomechanical maximum number of fractures based on the new stress field; and f) generate an optimized number, placement and size for two or more fractures in a subterranean formation, where when generating the optimized number, placement and size for two or more fractures in a subterranean formation is based, at least in part, on one or more of:

the geomechanical maximum number of fractures; and the new stress field based on the combination of the initial stress field and the new fracture stress field.

19. The computer program according to claim 18, wherein the executable instruction for performing steps (a) through (e) are executed by the at least one processor prior to creating any of the fractures in the subterranean formation.

20. The computer program according to claim 18, further comprising the steps of:

determining a cost-effective number of fractures;

determining an optimum number of fractures, where the optimum number of fractures is the maximum cost-effective number of fractures that does not exceed the geomechanical maximum number of fractures.

21. The computer program according to claim 18, further comprising executable instructions to cause the at least one processor to:

create one or more fractures in the subterranean formation; and repeat steps (a) through (e) after each fracture is created.

22. The computer program according to claim 21, wherein the executable instructions that cause the at least one processor to repeat steps (a) through (e) comprise executable instructions that cause the at least one processor to gather and analyze real-time fracturing data for each fracture created.

23. The computer program according to claim 22, wherein the executable instructions that cause the at least one processor to analyze real-time fracturing data further cause the at least one processor to:

determine an additional stress field, based on the real-time fracturing data; and compare the additional stress field with the new stress field.

24. A method of fracturing a subterranean formation, the method implemented in a computer system comprising at least one processor and a memory, the method comprising the step of:

optimizing a number, placement and size of fractures separated from each other along a well bore in the subterranean formation, the step of optimizing comprising:

a) modeling each fracture so as to provide modeled dimensions and a location for each fracture along the length of the well bore;
b) determining an initial stress field induced by the fractures and based on the modeled dimensions and the location of each fracture;
c) modeling a new fracture and determining a new fracture stress field based on the new fracture;
d) determining a new stress field based on a combination of the initial stress field and the new fracture stress field;
e) determining a geomechanical maximum number of fractures based on the new stress field;
f) inducing at least one fracture in the subterranean formation; and
g) generating an optimized number, placement and size for two or more fractures in a subterranean formation, where generating the optimized number, placement and size for two or more fractures in a subterranean formation is based, at least in part, on one or more of:
the geomechanical maximum number of fractures; and
the new stress field based on the combination of the initial stress field and the new fracture stress field.

25. The method according to claim 24, further comprising creating a fracture in the subterranean formation, wherein substeps (a) through (e) are performed prior to creating the fracture in the subterranean formation.

26. The method according to claim 24, wherein the optimizing step further comprises the substeps of:
determining a cost-effective number of fractures;
determining an optimum number of fractures, where the optimum number of fractures is the maximum cost-effective number of fractures that does not exceed the geomechanical maximum number of fractures.

27. The method according to claim 24, further comprising the steps of:
creating at least a second fracture in the subterranean formation; and
repeating substeps (a) through (e) of the optimizing step after each fracture is created.

28. The method according to claim 27, wherein the repeating step further comprises the steps of gathering and analyzing real-time fracturing data for each fracture created.

29. The method according to claim 28, wherein analyzing of real-time fracturing data comprises the steps of:
determining an additional stress field, based on the real-time fracturing data; and
comparing the additional stress field with the new stress field.

30. The method of claim 1, wherein generating an optimized number, placement and size for two or more fractures in a subterranean formation comprises:
generating an optimized number, placement and size for three or more fractures in the subterranean formation.

31. The computer program of claim 18, wherein the executable instructions that cause the at least one processor to generate an optimized number, placement and size for two or more fractures in a subterranean formation, further cause the at least one processor to:
generate an optimized number, placement and size for three or more fractures in the subterranean formation.

* * * * *